US010102627B2

United States Patent
Tsuda et al.

(10) Patent No.: US 10,102,627 B2
(45) Date of Patent: Oct. 16, 2018

(54) HEAD-MOUNTED DISPLAY DEVICE, METHOD OF CONTROLLING A HEAD-MOUNTED DISPLAY DEVICE, AN INFORMATION TRANSMITTING AND RECEIVING SYSTEM, AND A NON-TRANSITORY COMPUTER READABLE MEDIUM FOR AUGMENTING VISUALLY RECOGNIZED OUTSIDE SCENERY

(71) Applicant: SEIKO EPSON CORPORATION, Tokyo (JP)

(72) Inventors: Atsunari Tsuda, Suwa (JP); Masahide Takano, Matsumoto (JP); Toshikazu Uchiyama, Chino (JP); Hitomi Wakamiya, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 157 days.

(21) Appl. No.: 14/713,846

(22) Filed: May 15, 2015

(65) Prior Publication Data
US 2015/0348328 A1    Dec. 3, 2015

(30) Foreign Application Priority Data
Jun. 3, 2014    (JP) .................. 2014-114540

(51) Int. Cl.
*G09G 5/00*     (2006.01)
*G06T 7/00*     (2017.01)
(Continued)

(52) U.S. Cl.
CPC .......... *G06T 7/004* (2013.01); *G02B 27/0172* (2013.01); *G06T 7/74* (2017.01);
(Continued)

(58) Field of Classification Search
CPC .. G02B 2027/01; G02B 27/017; G06T 19/00; G06T 19/003; G06T 2207/30204;
(Continued)

(56) References Cited

U.S. PATENT DOCUMENTS

2007/0188522 A1\* 8/2007 Tsuyuki ............... G02B 27/017
345/632
2008/0298796 A1\* 12/2008 Kuberka ............... G03B 17/18
396/263
(Continued)

FOREIGN PATENT DOCUMENTS

JP    H08-287358 A    11/1996
JP    H11-142784 A    5/1999
(Continued)

OTHER PUBLICATIONS

Yi Fei Dong et al. Automatic Image Capturing and Processing for PetrolWatch, 2011 17th IEEE International Conference on Networks (ICON), Dec. 14-16, 2011.\*

*Primary Examiner* — Weiming He
(74) *Attorney, Agent, or Firm* — Oliff PLC

(57) ABSTRACT

A head-mounted display device includes an image display unit cause a user to visually recognize image light as a virtual image on the basis of image data and cause the user to visually recognize an outside scene in a state in which the image display unit is worn on the head of the user, an image pickup unit configured to pick up an image of the outside scene, and a control unit configured to cause, when a mark image, which is an image of a specific mark, is included in the picked-up image, using the image display unit, the user to visually recognize a specific virtual image associated with a combination of a kind of the mark image and a shape of the mark image.

18 Claims, 11 Drawing Sheets

(51) Int. Cl.
*G02B 27/01* (2006.01)
*G06T 7/73* (2017.01)

(52) U.S. Cl.
CPC .......... *G02B 2027/0178* (2013.01); *G06T 2207/30204* (2013.01)

(58) Field of Classification Search
CPC ....... G06T 7/0022; G06F 1/163; G06F 3/012; G06F 3/0482
See application file for complete search history.

(56) References Cited

U.S. PATENT DOCUMENTS

| | | | | |
|---|---|---|---|---|
| 2010/0060453 | A1* | 3/2010 | Kushida | G06Q 10/087 340/572.1 |
| 2011/0001695 | A1 | 1/2011 | Suzuki et al. | |
| 2011/0158478 | A1* | 6/2011 | Yamada | G02B 6/0006 382/103 |
| 2012/0188148 | A1* | 7/2012 | DeJong | G02B 27/0093 345/8 |
| 2012/0242560 | A1* | 9/2012 | Nakada | G09G 3/3406 345/8 |
| 2014/0118483 | A1* | 5/2014 | Rapoport | H04N 5/23258 348/36 |
| 2015/0145889 | A1 | 5/2015 | Hanai | |
| 2015/0179090 | A1* | 6/2015 | Blankitny | G09F 3/02 382/106 |
| 2017/0140653 | A9* | 5/2017 | Sasao | G08G 3/00 |

FOREIGN PATENT DOCUMENTS

| | | |
|---|---|---|
| JP | 2003-160211 A | 6/2003 |
| JP | 2005-173042 A | 6/2005 |
| JP | 2009-093489 A | 4/2009 |
| JP | 2009-159866 A | 7/2009 |
| JP | 2010-128133 A | 6/2010 |
| JP | 2010-176887 A | 8/2010 |
| JP | 2010-210822 A | 9/2010 |
| JP | 2011-014082 A | 1/2011 |
| JP | 2011-209805 A | 10/2011 |
| JP | 2012-181705 A | 9/2012 |
| JP | 2013-042221 A | 2/2013 |
| JP | 2013-200154 A | 10/2013 |
| JP | 2013-245029 A | 12/2013 |
| WO | 2013-187129 A1 | 12/2013 |

\* cited by examiner

HEAD-MOUNTED DISPLAY DEVICE, METHOD OF CONTROLLING A HEAD-MOUNTED DISPLAY DEVICE, AN INFORMATION TRANSMITTING AND RECEIVING SYSTEM, AND A NON-TRANSITORY COMPUTER READABLE MEDIUM FOR AUGMENTING VISUALLY RECOGNIZED OUTSIDE SCENERY

BACKGROUND

1. Technical Field

The present invention relates to a head-mounted display device.

2. Related Art

There is known a head-mounted display device (a head mounted display (HMD)), which is a display device mounted on a head. For example, the head-mounted display device generates image light representing an image using a liquid crystal display and a light source and guides the generated image light to the eyes of a user using a projection optical system and a light guide plate to thereby cause the user to visually recognize a virtual image. As the head-mounted display device, there are two types, i.e., a transmission type with which the user can visually recognize an outside scene in addition to the virtual image and a non-transmission type with which the user cannot visually recognize the outside scene. As the head-mounted display device of the transmission type, there are an optical transmission type and a video transmission type.

JP-A-2013-245029 (Patent Literature 1) discloses a picking system that, in a state in which a plurality of operators wearing HMDs line up along a conveyor for conveying articles, when an article set in advance is conveyed, causes the HMDs worn by the operators to display, as an image, a place where the conveyed article should be picked up and stored. JP-A-2012-181705 (Patent Literature 2) discloses a barcode reading device that, when a plurality of commodities affixed with barcodes are detected in a picked-up image and one barcode is selected by operation of a touch panel on which the picked-up image is displayed, displays information concerning a commodity affixed with the selected barcode on the touch panel as an image. JP-A-2009-93489 (Patent Literature 3) discloses an HMD that, when a video camera provided in the HMD worn by a cashier at a register picks up an image in a visual line direction of the cashier and a plurality of commodities affixed with barcodes are detected in the picked-up image, automatically detects a barcode of one commodity present in the center of the visual line of the cashier.

However, in the picking system described in Patent Literature 1, the conveyor and positions where the operators work are fixed. Images displayed on the HMDs worn by the operators are images of commodities conveyed by the conveyor. Therefore, the commodities are extremely limited. It is desired to enable the operators and other users of HMDs to visually recognize various images according to desires of the operators and the users. In the techniques described in Patent Literature 2 and Patent Literature 3, the image displayed on the touch panel is information concerning the commodity affixed with the selected barcodes. It is desired to display images corresponding to information other than barcodes. Besides, in the HMDs in the past, for example, improvement of convenience of use is desired.

JP-A-2003-160211, JP-A-2005-173042, JP-A-2010-128133, JP-A-2013-42221, JP-A-2013-200154, JP-A-2009-159866, JP-A-8-287358 are examples of the related art.

SUMMARY

An advantage of some aspects of the invention is to solve at least apart of the problems described above, and the invention can be implemented as the following aspects.

(1) An aspect of the invention provides a head-mounted display device of a transmission type. The head-mounted display device includes: an image display unit capable of displaying an image and transmitting an outside scene; a direction specifying unit configured to specify a direction of the image display unit; a receiving unit configured to receive information transmitted from another device; and a control unit configured to display, when the information is received by the receiving unit and a positional relation between the specified direction of the image display unit and the other device is a specific positional relation set in advance, an image associated with the received information using the image display unit. With the head-mounted display device in this aspect, when the image display unit is in a range in which information can be received and the positional relation between the direction of the image display unit and the other device is the specific positional relation, it is possible to cause, by receiving the information, a user to visually recognize, as an image, information corresponding to a limited region. Consequently, the user can visually recognize an image corresponding to information corresponding to a place and a direction. Therefore, it is possible to acquire necessary information as appropriate.

(2) The head-mounted display device according to the aspect described above may further include a detecting unit configured to detect a specific mark out of the outside scene, and the control unit may display, when the positional relation is the specific positional relation and a positional relation between the direction of the image display unit and the detected specific mark is a positional relation set in advance, an image associated with the received information and the detected specific mark. With the head-mounted display device according to this aspect, a virtual image generated on the image display unit is different according to a positional relation between the other device that transmits information and a commodity affixed with the specific mark. It is possible to cause the user to visually recognize a larger number of kinds of virtual images according to places and specific marks. Convenience for the user is improved.

(3) In the head-mounted display device according to the aspect described above, the control unit may extract, when a plurality of the specific marks are detected out of the outside scene, one specific mark out of the plurality of specific marks on the basis of the specified direction of the image display unit. With the head-mounted display device according to this aspect, the user can select one specific mark out of the plurality of specific marks without using a hand and can sensuously select the specific mark. Therefore, convenience of use for the user is improved.

(4) In the head-mounted display device according to the aspect described above, the control unit may display, using the image display unit, an image indicating a position of the detected specific mark. With the head-mounted display device according to this aspect, the user can visually recognize a visual image set to correspond to which specific mark is displayed on the image display unit. Therefore, convenience of use for the user is improved.

(5) The head-mounted display device according to the aspect described above may further include a distance measuring unit configured to measure a distance between the image display unit and the specific mark. The control unit may display an image associated with the measured distance, the received information, and the detected specific mark. With the head-mounted display device according to this aspect, it is possible to cause the user to visually recognize an image formed taking into account the distance between the specific mark and the image display unit as well. Convenience for the user is improved.

(6) In the head-mounted display device according to the aspect described above, the control unit may display, when a plurality of the specific marks are detected out of the outside scene, an image associated with the specific mark having a smallest distance to the image display unit among the detected plurality of specific marks and the received information. With the head-mounted display device according to this aspect, it is possible to cause the user to visually recognize an image formed taking into account the distance between the specific mark and the image display unit as well. Convenience for the user is improved.

Not all of the plurality of components included in the aspects of the invention explained above are essential. In order to solve a part or all of the problems explained above or attain a part or all of the effects described in this specification, concerning a part of the plurality of components, it is possible to perform a change, deletion, and replacement of the components with other components and deletion of a part of limitation contents. In order to solve a part or all of the problems or in order to attain a part or all of the effects described in this specification, it is possible to combine a part or all of the technical features included in one aspect of the invention explained above with a part or all of the technical features included in the other aspects of the invention to form an independent one aspect of the invention.

For example, one aspect of the invention can be implemented as a device including one or two or more of the four elements, i.e., the image display unit, the direction specifying unit, the receiving unit, and the control unit. That is, the device may or may not include the image display unit. The device may or may not include the direction specifying unit. The device may or may not include the receiving unit. The device may or may not include the control unit. For example, the image display unit may be capable of displaying an image and transmitting an outside scene. For example, the direction specifying unit may specify a direction of the image display unit. For example, the receiving unit may receive information transmitted from another device. For example, the control unit may display, when the information is received by the receiving unit and a positional relation between the specified direction of the image display unit and the other device is a specific positional relation set in advance, an image associated with the received information using the image display unit. Such a device can be implemented as, for example, a head-mounted display device. However, the device can also be implemented as another device other than the head-mounted display device. According to such an aspect, it is possible to attain at least one of various objects such as improvement of operability and simplification of the device, integration of the device, and improvement of convenience for a user who uses the device. A part or all of the technical features of the aspects of the head-mounted display device explained above can be applied to this device.

The invention can also be implemented as various forms other than the head-mounted display device. The invention can be implemented in forms of, for example, a method of controlling the head-mounted display device, a head-mounted display system and an information transmitting and receiving system, a computer program for implementing the head-mounted display system or the information transmitting and receiving system, a recording medium having recorded therein the computer program, and a data signal including the computer program and embodied in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Embodiment

A-1. Configuration of an Information Transmitting and Receiving System

Figure 1:
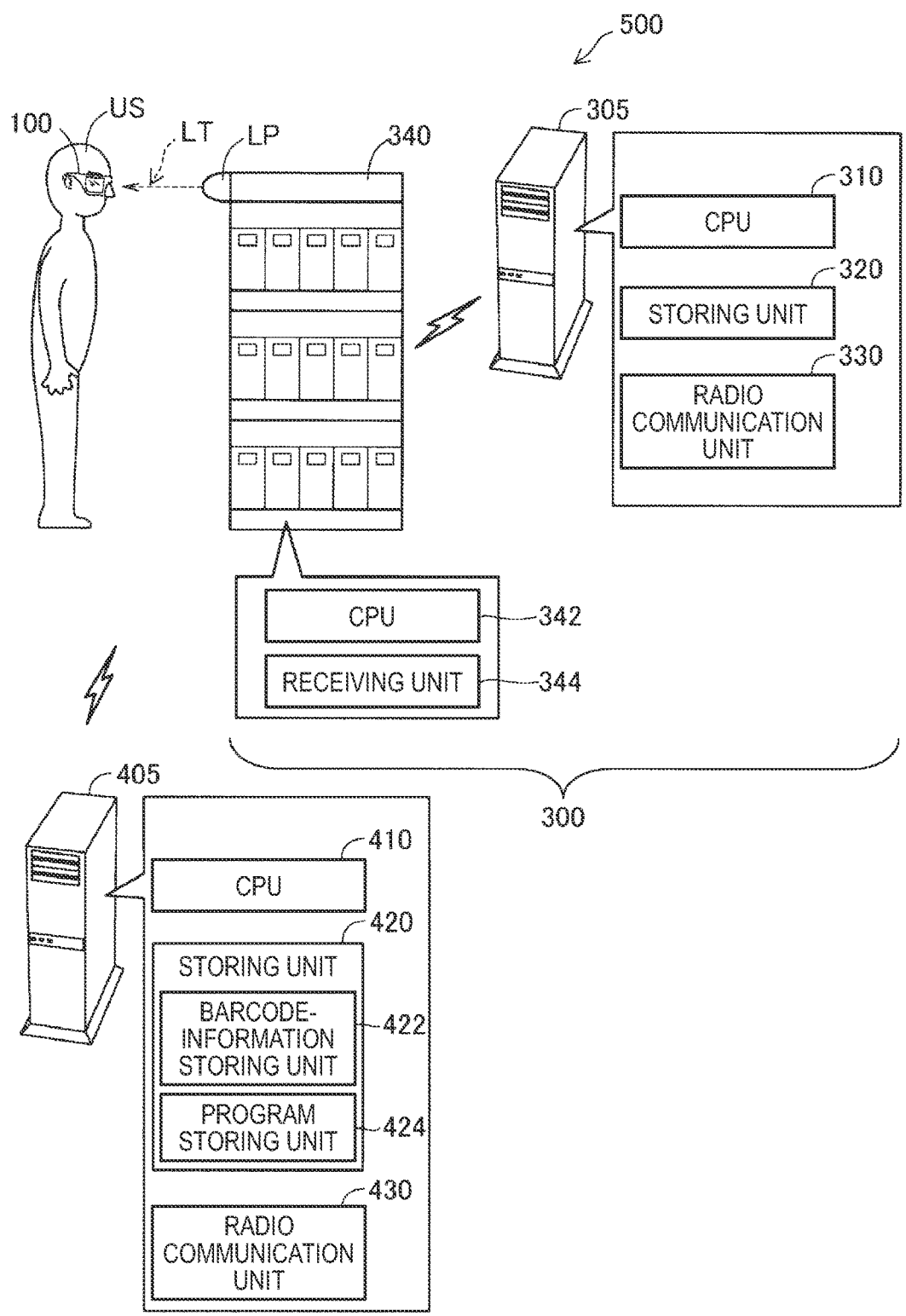
FIG. 1 is an explanatory diagram showing the configuration of an information transmitting and receiving system in an embodiment.

FIG. 1 is an explanatory diagram showing the configuration of an information transmitting and receiving system 500 in an embodiment. The information transmitting and receiving system 500 includes a head mounted display 100 (HMD 100) mounted on the head of a user US to cause the user US to visually recognize a virtual image, an information transmitting device 300, and a barcode-information storage server 405 that stores information corresponding to barcodes. Note that, in the information transmitting and receiving system 500, only one HMD 100, one information transmitting device 300, and one barcode-information storage server 405 are provided. However, a plurality of HMDs 100 and the like may be provided. In this embodiment, for convenience, forming a virtual image using the HMD 100 is also referred to as "display an image". For convenience, the virtual image to be formed is also referred to as "displayed image".

The information transmitting device 300 includes a server 305 and a shelf 340. The server 305 includes a storing unit 320 that stores information transmitted as an electromagnetic wave of visible light via a lamp LP disposed in the shelf 340 (hereinafter simply referred to as "light information"), a radio communication unit 330 that transmits information to a receiving unit 344 of the shelf 340, and a CPU 310. The storing unit 320 is configured by a ROM, a RAM, and the like. The storing unit 320 has stored therein image data serving as a displayed image displayed on the HMD 100 when the light information is received by the HMD 100. The storing unit 320 has stored therein various computer programs.

The radio communication unit 330 performs radio communication with other apparatuses such as the shelf 340 according to a predetermined radio communication system such as a wireless LAN or a Bluetooth (registered trademark). The CPU 310 reads out and executes a computer program stored in the storing unit 320. The CPU 310 transmits information stored in the storing unit 320 to the shelf 340 via the radio communication unit 330.

The shelf 340 includes the lamp LP, a CPU 342, and the receiving unit 344. The receiving unit 344 receives information transmitted from the radio communication unit 330 of the server 305. The CPU 342 transmits, using the lamp LP, as light information, the information received via the radio communication unit 330.

The barcode-information storage server 405 includes a CPU 410, a storing unit 420, and a radio communication unit 430. The storing unit 420 is configured by a ROM, a RAM, and the like. The storing unit 420 includes a barcode-information storing unit 422 and a program storing unit 424. The barcode-information storing unit 422 has stored therein, in association with barcodes, information concerning commodities affixed with the barcodes. The program storing unit 424 has stored therein various computer programs.

The radio communication unit 430 receives information of a barcode read and transmitted by the HMD 100. Details of the barcode read by the HMD 100 are explained below. The CPU 410 transmits information concerning a commodity affixed with the read barcode to the HMD 100 via the radio communication unit 430. The CPU 410 reads out and executes a computer program stored in the program storing unit 424 of the storing unit 420.

Figure 2:
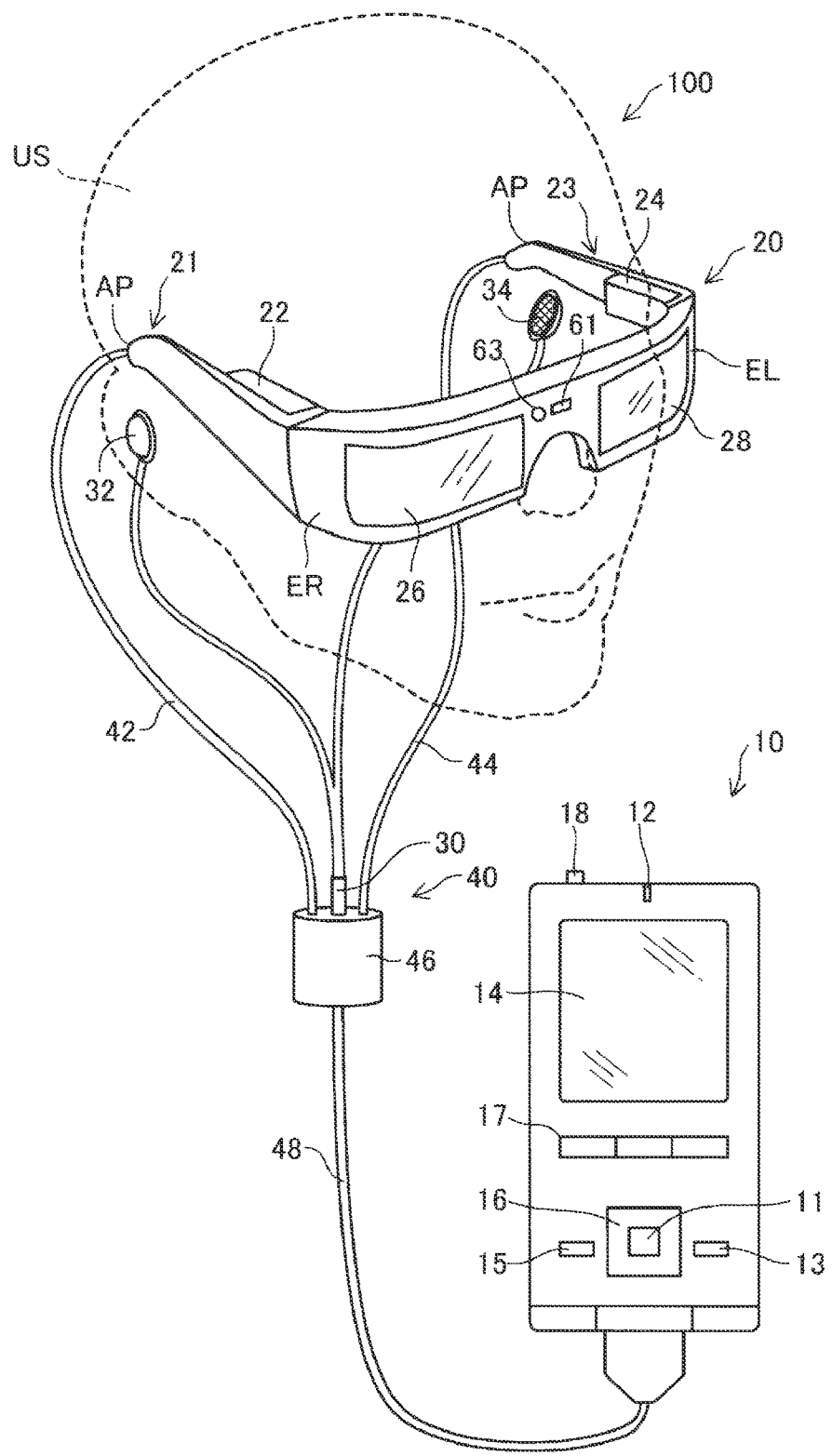
FIG. 2 is an explanatory diagram showing the external configuration of an HMD.

FIG. 2 is an explanatory diagram showing the external configuration of the HMD 100. In FIG. 2, a detailed external configuration of the HMD 100 shown in FIG. 1 is shown. The HMD 100 in this embodiment is a head-mounted display device of an optical transmission type with which the user US is capable of directly visually recognizing an outside scene simultaneously with visually recognizing a virtual image. The HMD 100 includes an image display unit 20 that causes the user US to visually recognize a virtual image in a state in which the image display unit 20 is worn on the head of the user US and a control unit 10 (a controller 10) that controls the image display unit 20.

The image display unit 20 is a wearing body worn on the head of the user US. In this embodiment, the image display unit 20 has an eyeglass shape. The image display unit 20 includes a right holding unit 21, a right display driving unit 22, a left holding unit 23, a left display driving unit 24, a right optical-image display unit 26, a left optical-image display unit 28, a camera 61, and a light receiving unit 63. The right optical-image display unit 26 and the left optical-image display unit 28 are respectively disposed to be located in front of the right and left eyes of the user US when the user US wears the image display unit 20. One end of the right optical-image display unit 26 and one end of the left optical-image display unit 28 are connected to each other in a position corresponding to the middle of the forehead of the user US when the user US wears the image display unit 20.

The right holding unit 21 is a member provided to extend from an end portion ER, which is the other end of the right optical-image display unit 26, to a position corresponding to the temporal region of the user US when the user US wears the image display unit 20. Similarly, the left holding unit 23 is a member provided to extend from an end portion EL, which is the other end of the left optical-image display unit 28, to a position corresponding to the temporal region of the user US when the user US wears the image display unit 20. The right holding unit 21 and the left holding unit 23 hold the image display unit 20 on the head of the user US like temples of eyeglasses.

The right display driving unit 22 and the left display driving unit 24 are disposed on sides opposed to the head of the user US when the user US wears the image display unit 20. Note that, in the following explanation, the right holding unit 21 and the left holding unit 23 are also collectively simply referred to as "holding units". The right display driving unit 22 and the left display driving unit 24 are also collectively simply referred to as "display driving units". The right optical-image display unit 26 and the left optical-image display unit 28 are also collectively simply referred to as "optical-image display units".

The display driving units 22 and 24 include liquid crystal displays 241 and 242 (hereinafter referred to as "LCDs 241 and 242") and projection optical systems 251 and 252 (see FIG. 3). Details of the configuration of the display driving units 22 and 24 are explained below. The optical-image display units 26 and 28 functioning as optical members include light guide plates 261 and 262 (see FIG. 3) and dimming plates. The light guide plates 261 and 262 are formed of a light transmissive resin material or the like and guide image lights output from the display driving units 22 and 24 to the eyes of the user US. The dimming plates are thin plate-like optical elements and are disposed to cover the front side of the image display unit 20, which is a side opposite to the side of the eyes of the user US. The dimming plates protect the light guide plates 261 and 262 and suppress damage, adhesion of soil, and the like to the light guide plates 261 and 262. By adjusting the light transmittance of the dimming plates, it is possible to adjust an external light amount entering the eyes of the user US and adjust easiness of visual recognition of the virtual image. Note that the dimming plates can be omitted.

The camera 61 is disposed in a position corresponding to the middle of the forehead of the user US when the user US wears the image display unit 20. Therefore, in a state in which the user US wears the image display unit 20 on the head, the camera 61 picks up an image of an outside scene, which is a scene on the outside, in the front of the user US and acquires a picked-up image. The camera 61 is a monocular camera but may be a stereo camera. The light receiving unit 63 receives light information of a wavelength and a frequency set in advance. In this embodiment, the light receiving unit 63 receives light information transmitted from the lamp LP of the shelf 340.

The image display unit 20 further includes a connecting unit 40 for connecting the image display unit 20 to the control unit 10. The connecting unit 40 includes a main body cord 48 connected to the control unit 10, a right cord 42 and a left cord 44, and a coupling member 46. The right cord 42 and the left cord 44 are cords branching from the main body cord 48. The right cord 42 is inserted into a housing of the right holding unit 21 from a distal end portion AP in an extending direction of the right holding unit 21 and connected to the right display driving unit 22. Similarly, the left cord 44 is inserted into a housing of the left holding unit 23 from a distal end portion AP in an extending direction of the left holding unit 23 and connected to the left display driving unit 24. The coupling member 46 is provided at a branching point of the main body cord 48 and the right cord 42 and the left cord 44 and includes a jack for connecting an earphone plug 30. A right earphone 32 and a left earphone 34 extend from the earphone plug 30.

The image display unit 20 and the control unit 10 perform transmission of various signals via the connecting unit 40. Connectors (not shown in the figure), which fit with each other, are respectively provided at an end portion on the opposite side of the coupling member 46 in the main body cord 48 and in the control unit 10. The control unit 10 and the image display unit 20 are connected and disconnected according to fitting and unfitting of the connector of the main body cord 48 and the connector of the control unit 10. For example, a metal cable or an optical fiber can be adopted as the right cord 42, the left cord 44, and the main body cord 48.

The control unit 10 is a device for controlling the HMD 100. The control unit 10 includes a determination key 11, a lighting unit 12, a display switching key 13, a track pad 14, a luminance switching key 15, a direction key 16, a menu key 17, and a power switch 18. The determination key 11 detects pressing operation and outputs a signal for determining contents of the operation in the control unit 10. The lighting unit 12 notifies, with a light emission state thereof, an operation state of the HMD 100. As the operation state of the HMD 100, there is, for example, ON/OFF of a power supply. As the lighting unit 12, for example, an LED is used. The display switching key 13 detects pressing operation and outputs, for example, a signal for switching a display mode of a content moving image to 3D and 2D. The track pad 14 detects operation by a finger of the user US on an operation surface of the track pad 14 and outputs a signal corresponding to detected content. As the track pad 14, various types such as an electrostatic type, a pressure type, and an optical type can be adopted. The luminance switching key 15 detects pressing operation and outputs a signal for increasing or reducing the luminance of the image display unit 20. The direction key 16 detects pressing operation on keys corresponding to the up, down, left, and right directions and outputs a signal corresponding to detected content. The power switch 18 detects slide operation of the switch to switch a power supply state of the HMD 100.

Figure 3:
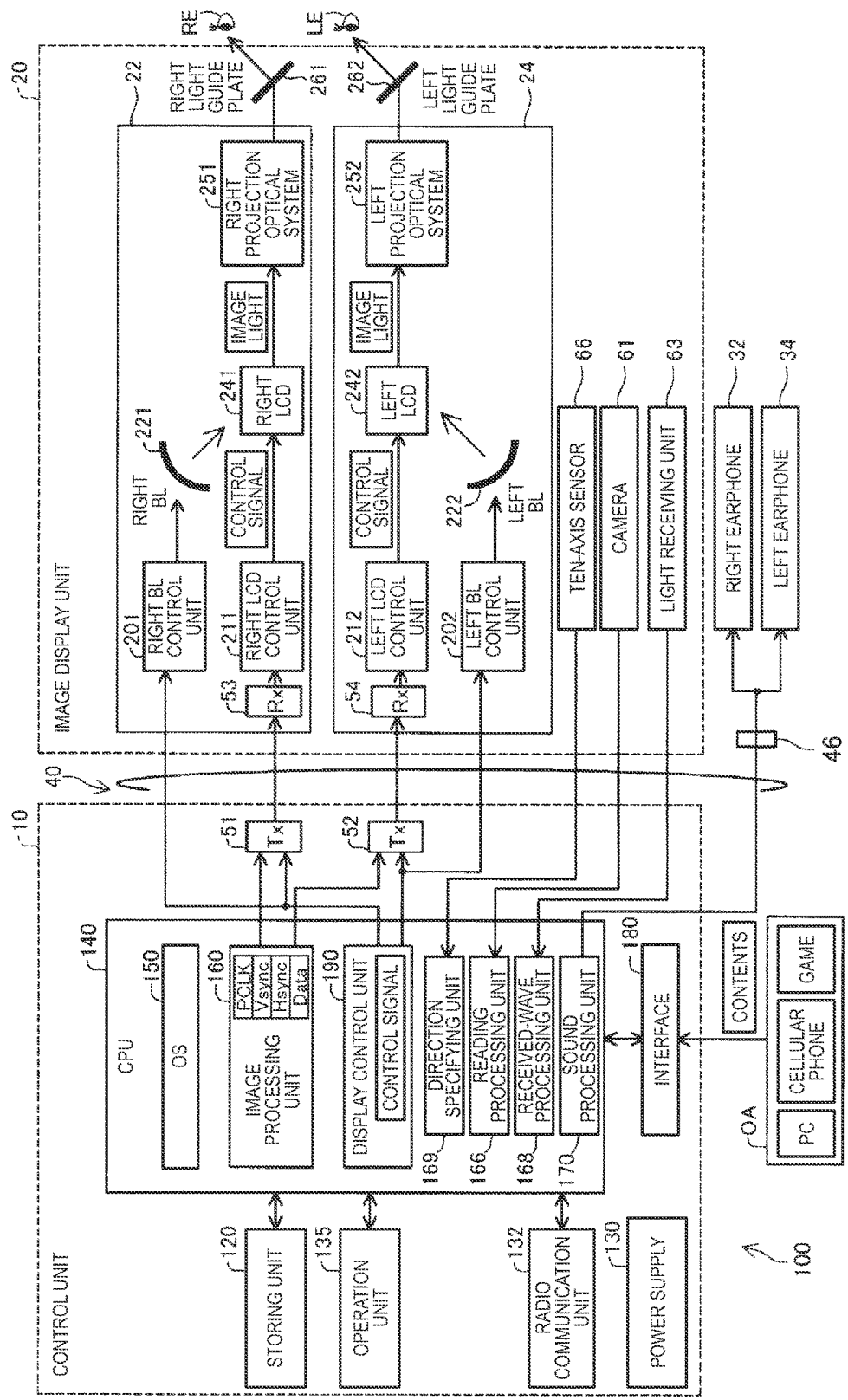
FIG. 3 is a block diagram functionally showing the configuration of the HMD.

FIG. 3 is a block diagram functionally showing the configuration of the HMD 100. As shown in FIG. 3, the control unit 10 includes a storing unit 120, a power supply 130, a radio communication unit 132, an operation unit 135, a CPU 140, an interface 180, and a transmitting unit 51 (Tx 51) and a transmitting unit 52 (Tx 52). The operation unit 135 receives operation by the user US. The operation unit 135 is configured from the determination key 11, the display switching key 13, the track pad 14, the luminance switching key 15, the direction key 16, the menu key 17, and the power switch 18.

The power supply 130 supplies electric power to the units of the HMD 100. As the power supply 130, for example, a secondary cell can be used. The storing unit 120 has stored therein various computer programs. The storing unit 120 is configured by a ROM, a RAM, and the like. The radio communication unit 132 performs radio communication with other apparatuses according to a predetermined radio communication standard such as a wireless LAN or a Bluetooth (registered trademark). The radio communication unit 132 transmits information of a barcode read by a reading processing unit 166 explained below to the radio communication unit 430 of the barcode-information storage server 405. The radio communication unit 132 receives, via the radio communication unit 430, information provided with the read barcode from a barcode-information storing unit 422.

The CPU 140 reads out and executes a computer program stored in the storing unit 120 to thereby function as an operating system 150 (OS 150), a display control unit 190, a sound processing unit 170, an image processing unit 160, a received-wave processing unit 168, a reading processing unit 166, a direction specifying unit 169, and the interface 180.

The display control unit 190 generates control signals for controlling the right display driving unit 22 and the left display driving unit 24. Specifically, the display control unit 190 individually controls, using the control signals, ON/OFF of driving of the right LCD 241 by a right LCD control unit 211, ON/OFF of driving of a right backlight 221 by a right backlight control unit 201, ON/OFF of driving of the left LCD 242 by a left LCD control unit 212, ON/OFF of driving of a left backlight 222 by a left backlight control unit 202, and the like. Consequently, the display control unit 190 controls generation and emission of image lights respectively by the right display driving unit 22 and the left display driving unit 24. For example, the display control unit 190 causes both of the right display driving unit 22 and the left display driving unit 24 to generate image light, causes only one of the right display driving unit 22 and the left display driving unit 24 to generate image light, or does not cause both of the right display driving unit 22 and the left display driving unit 24 to generate image light.

The display control unit 190 transmits control signals for the right LCD control unit 211 and the left LCD control unit 212 respectively via the transmitting units 51 and 52. The display control unit 190 respectively transmits control signals for the right backlight control unit 201 and the left backlight control unit 202.

The image processing unit 160 acquires an image signal included in contents, separates synchronization signals such as a vertical synchronization signal VSync and a horizontal synchronization signal HSync from the acquired image signal. The image processing unit 160 generates a clock signal PCLK using a PLL (Phase Locked Loop) circuit or the like according to cycles of the separated vertical synchronization signal VSync and horizontal synchronization signal HSync. The image processing unit 160 converts an analog image signal, from which the synchronization signals are separated, into a digital image signal using an A/D conversion circuit or the like (not shown in the figure). Thereafter, the image processing unit 160 stores the digital image signal after the conversion in a DRAM in the storing unit 120 frame by frame as image data (RGB data) of a target image. Note that the image processing unit 160 may execute, on the image data, image processing such as resolution conversion processing, various kinds of tone correction processing for adjustment of luminance and chroma, and keystone correction processing according to necessity.

The image processing unit 160 transmits the clock signal PCLK, the vertical synchronization signal VSync, and the horizontal synchronization signal HSync generated by the image processing unit 160 and the image data stored in the DRAM in the storing unit 120 respectively via the transmitting units 51 and 52. Note that the image data transmitted via the transmitting unit 51 is referred to as "image data for right eye" as well. The image data transmitted via the transmitting unit 52 is referred to as "image data for left eye" as well. The transmitting units 51 and 52 function as a transceiver for serial transmission between the control unit 10 and the image display unit 20.

The sound processing unit 170 acquires a sound signal included in the contents, amplifies the acquired sound signal, and supplies the amplified sound signal to a speaker (not shown in the figure) in the right earphone 32 or a speaker (not shown in the figure) in the left earphone 34 connected to the coupling member 46. Note that, for example, when a Dolby (registered trademark) system is adopted, processing for the sound signal is performed. Different sounds, the frequencies or the like of which are varied, are respectively output from the right earphone 32 and the left earphone 34.

The received-wave processing unit 168 generates image data corresponding to light information received by the light receiving unit 63. The image processing unit 160 displays an image on an image-light generating unit on the basis of the image data generated by the received-wave processing unit 168.

The reading processing unit 166 detects, according to pattern matching or a statistical identification method, whether a barcode is included in a picked-up image picked up by the camera 61. When the barcode is detected out of the picked-up image, the reading processing unit 166 transmits information of the detected barcode to the radio communication unit 430 of the barcode-information storage server 405 via the radio communication unit 132. Note that the reading processing unit 166 and the camera 61 in this embodiment are equivalent to a detecting unit in the appended claims. The reading processing unit 166, the received-wave processing unit 168, and the image processing unit 160 in this embodiment are equivalent to a control unit in the appended claims.

The direction specifying unit 169 specifies the direction of the image display unit 20 on the basis of terrestrial magnetism detected by a ten-axis sensor 66 explained below. That is, the direction specifying unit 169 can specify the front of the user US wearing the image display unit 20 and estimate a visual line direction of the user US. Note that the direction specifying unit 169 and the ten-axis sensor 66 in this embodiment are equivalent to a direction specifying unit in the appended claims.

The interface 180 is an interface for connecting various external apparatuses OA, which are supply sources of contents, to the control unit 10. Examples of the external apparatuses OA include a personal computer PC, a cellular phone terminal, and a game terminal. As the interface 180, for example, a USB interface, a micro USB interface, or an interface for a memory card can be used.

The image display unit 20 includes the right display driving unit 22, the left display driving unit 24, the ten-axis sensor 66, the right light guide plate 261 functioning as the right optical-image display unit 26, the left light guide plate 262 functioning as the left optical-image display unit 28, the camera 61, and the light receiving unit 63.

The right display driving unit 22 includes a receiving unit 53 (Rx 53), the right backlight control unit 201 (right BL control unit 201) and the right backlight 221 (right BL 221) functioning as a light source, the right LCD control unit 211 and the right LCD 241 functioning as a display element, and the right projection optical system 251. The right backlight control unit 201 and the right backlight 221 function as the light source. The right LCD control unit 211 and the right LCD 241 function as the display element. Note that the right backlight control unit 201, the right LCD control unit 211, the right backlight 221, and the right LCD 241 are collectively referred to as "image-light generating unit" as well.

The receiving unit 53 functions as a receiver for serial transmission between the control unit 10 and the image display unit 20. The right backlight control unit 201 drives the right backlight 221 on the basis of an input control signal. The right backlight 221 is, for example, a light emitting body such as an LED or an electroluminescence (EL). The right LCD control unit 211 drives the right LCD 241 on the basis of the clock signal PCLK, the vertical synchronization signal VSync, the horizontal synchronization signal HSync, and the image data for right eye input via the receiving unit 53. The right LCD 241 is a transmissive liquid crystal panel on which a plurality of pixels are disposed in a matrix shape.

The right projection optical system 251 is configured by a collimate lens that changes the image light emitted from the right LCD 241 to light beams in a parallel state. The right light guide plate 261 functioning as the right optical-image display unit 26 guides the image light output from the right projection optical system 251 to the right eye RE of the user US while reflecting the image light along a predetermined optical path. Note that the right projection optical system 251 and the right light guide plate 261 are collectively referred to as "light guide unit" as well.

The left display driving unit 24 includes a configuration same as the configuration of the right display driving unit 22. That is, the left display driving unit 24 includes a receiving unit 54 (Rx 54), the left backlight control unit 202 (left BL control unit 202) and the left backlight 222 (left BL 222) functioning as a light source, the left LCD control unit 212 and the left LCD 242 functioning as a display element, and the left projection optical system 252. The left backlight control unit 202 and the left backlight 222 function as the light source. The left LCD control unit 212 and the left LCD 242 function as the display element. Note that the left backlight control unit 202, the left LCD control unit 212, the left backlight 222, and the left LCD 242 are collectively referred to as "image-light generating unit" as well. The left projection optical system 252 is configured by a collimate lens that changes image light emitted from the left LCD 242 to light beams in a parallel state. The left guide plate 262 functioning as the left optical-image display unit 28 guides the image light output from the left projection optical system 252 to the left eye LE of the user US while reflecting the image light along a predetermined optical path. Note that the left projection optical system 252 and the left light guide plate 262 are collectively referred to as "light guide unit" as well.

The ten-axis sensor 66 is a sensor that detects acceleration (three axes), angular velocity (three axes), terrestrial magnetism (three axes), and atmospheric pressure (one axis). The ten-axis sensor 66 is incorporated near the right display driving unit 22 in the image display unit 20. When the image display unit 20 is worn on the head of the user US, the ten-axis sensor 66 detects the movement and the position of the head of the user US.

Figure 4:
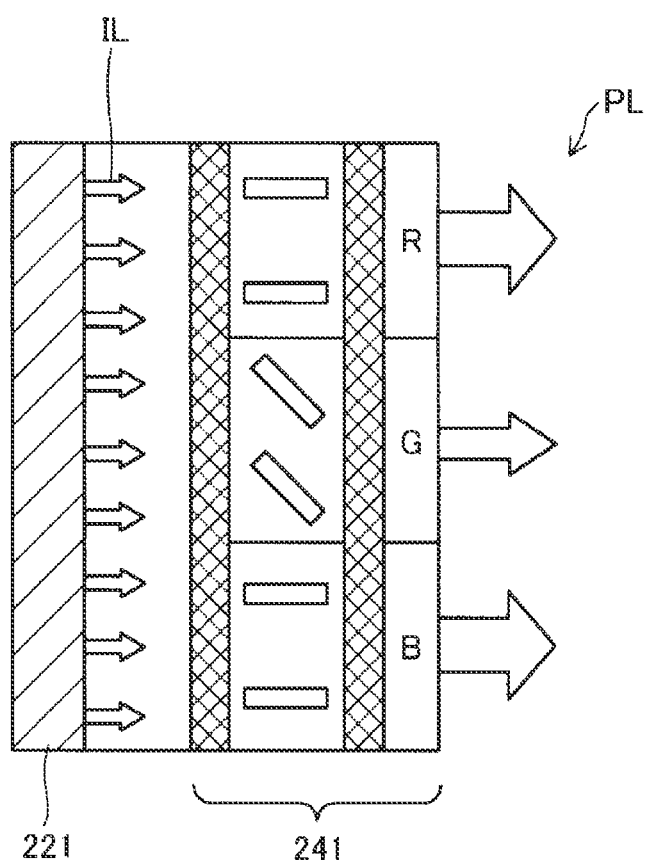
FIG. 4 is an explanatory diagram showing a state in which image light is emitted by an image-light generating unit.

FIG. 4 is an explanatory diagram showing a state in which image light is emitted by the image-light generating unit. The right LCD 241 changes, by driving liquid crystal in pixel positions disposed in a matrix shape, the transmittance of light transmitted through the right LCD 241 to thereby modulate illumination light IL irradiated from the right backlight 221 into effective image light PL representing an image. The same holds true concerning the left side. Note that, as shown in FIG. 3, a backlight system is adopted in this embodiment. However, image light may be emitted using a front light system or a reflection system.

A-2. Information Detection Processing

Figure 5:
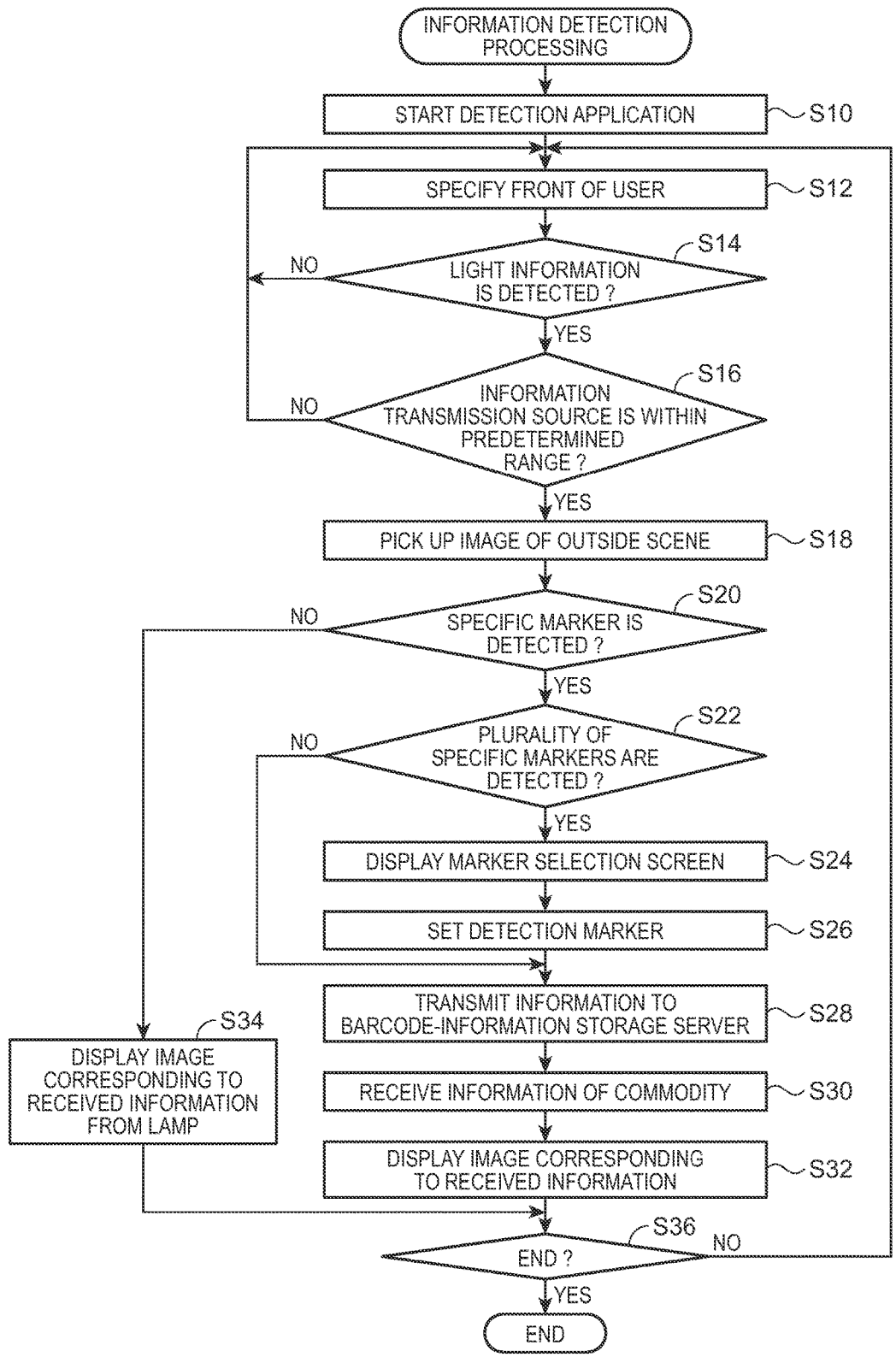
FIG. 5 is an explanatory diagram showing a flow of information detection processing.

FIG. 5 is an explanatory diagram showing a flow of information detection processing. In the information detection processing, the control unit 10 causes the image display unit 20 to display an image corresponding to received light information and a barcode detected from a picked-up image.

First, when the operation unit 135 receives predetermined operation for selecting a detection application for light information for performing the information detection processing, the CPU 140 of the control unit 10 starts the detection application for light information (step S10). When the detection application starts, the direction specifying unit 169 specifies the front of the user US on the basis of the direction of the image display unit 20 detected by the ten-axis sensor 66 (step S12). Subsequently, the received-wave processing unit 168 stands by for detection of light information transmitted from the lamp LP via the radio communication unit 132 (step S14). When light information is not detected (No in step S14), the CPU 140 repeats the processing in step S12 until light information is detected.

When light information is detected in the processing in step S14 (YES in step S14), the direction specifying unit 169 determines whether the lamp LP, which is an information transmission source that transmits the light information, is included in a predetermined range in the specified front of the user US (step S16). When it is determined that the lamp LP, which is the information transmission source, is not within the predetermined range (NO in step S16), an image set to correspond to the light information received by the received-wave processing unit 168 is not displayed. The CPU 140 performs processing in step S12 and subsequent steps.

When it is determined in the processing in step S16 that the lamp LP, which is the information transmission source, is present within the predetermined range (YES in step S16), the camera 61 picks up an image of an outside scene (step S18). In this embodiment, the camera 61 is set to pick up an image in a range of a visual field assumed to be visually recognized by the user US. Subsequently, the reading processing unit 166 detects, out of the picked-up image, a barcode functioning as a specific marker set in advance (step S20). Note that the specific marker in this embodiment is equivalent to a specific mark in the appended claims.

Figure 6:
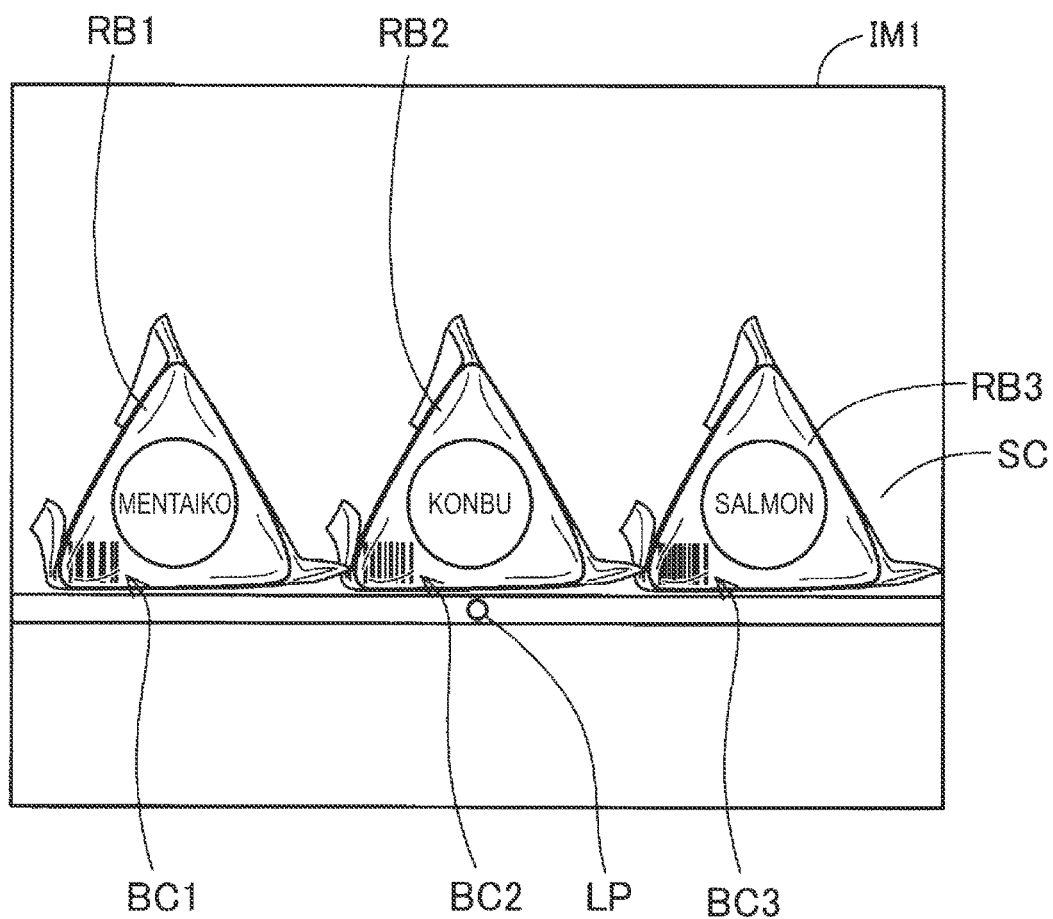
FIG. 6 is an explanatory diagram showing an example of a picked-up image.

FIG. 6 is an explanatory diagram showing an example of the picked-up image. As shown in FIG. 6, the camera 61 picks up, as a picked-up image IM1, an image of an outside scene SC including three rice balls RB1, RB2, and RB3 of different kinds displayed on the shelf 340 and the lamp LP, which is the information transmission source, disposed on the shelf 340. Barcodes BC1, BC2, and BC3 functioning as specific markers are affixed to respective wrappings of the rice balls RB1, RB2, and RB3. Names of food ingredients in the respective rice balls are written on the wrappings. Note that a rice ball is food of rice formed in a specific shape such as a triangular shape and including an ingredient such as salmon. In this embodiment, "rice ball" is illustrated as an example of displayed commodities. However, in other embodiments, the commodities may be sandwiches, other foods, and commodities other than foods instead of the rice balls.

When a barcode is detected as a specific marker in the processing in step S20 in FIG. 5 (YES in step S20), the reading processing unit 166 determines whether a plurality of barcodes are detected as specific markers (step S22). In the example shown in FIG. 6, the number of the detected barcodes is three, i.e., plurality (YES in step S22). Therefore, the reading processing unit 166 causes the image-light generating unit to display a marker selection image for selecting one marker out of the detected plurality of specific markers (step S24).

Figure 7:
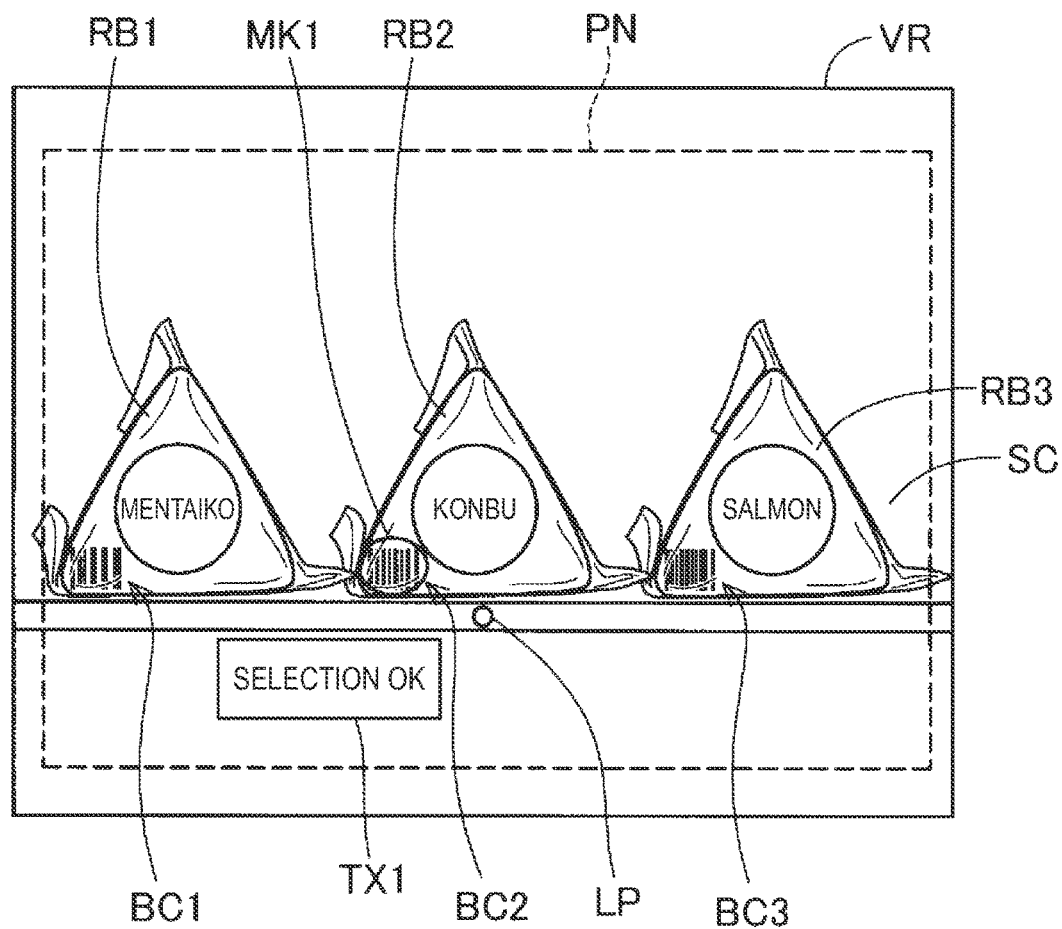
FIG. 7 is an explanatory diagram showing a visual field visually recognized by a user when a marker selection image is displayed.

FIG. 7 is an explanatory diagram showing a visual field VR visually recognized by the user US when the marker selection image is displayed. As shown in FIG. 7, the user US visually recognizes the outside scene SC and a marker selection image MK1 and a text image TX1 displayed by the image display unit 20. Note that, in FIG. 7, an image display largest region PN, in which the image display unit 20 can display an image, is shown. An outer frame (a broken line in FIG. 7) of the image display largest area PN is not visually recognized by the user US. The reading processing unit 166 displays the marker selection image MK1 in the image display largest region PN to surround one barcode BC2 closest from the center of the picked-up image among the detected barcodes BC1, BC2, and BC3 functioning as the plurality of markers. The reading processing unit 166 displays the marker selection image MK1 in the image display largest region PN and displays, near the barcode BC2 in the image display largest region PN, the text image TX1 of "selection OK?" indicating whether the barcode BC2 surrounded by the marker selection image MK1 may be selected as one specific marker.

After the marker selection image MK1 is displayed (step S24 in FIG. 5), when the operation unit 135 receives operation for selecting one specific marker out of the plurality of specific markers, the reading processing unit 166 sets the selected marker as a detection marker (step S26). Note that, in the processing in step S26, the direction key 16 of the operation unit 135 is operated, whereby the barcode surrounded by the marker selection image MK1 is changed. The determination key 11 is pressed, whereby the barcode surrounded by the marker selection image MK1 is selected as the detection marker.

When the detection marker is set, the reading processing unit 166 transmits, via the radio communication unit 132, information of the detected marker and the light information transmitted from the lamp LP to the radio communication unit 430 of the barcode-information storage server 405 (step S28). Subsequently, the reading processing unit 166 receives, via the radio communication unit 430, information concerning a commodity affixed with a barcode of the detection marker transmitted by the barcode-information storage server 405 via the radio communication unit 132 (step S30). The CPU 410 of the barcode-information storage server 405 transmits image information for display corresponding to the transmitted information of the detection marker and the light information transmitted from the lamp LP to the radio communication unit 132 of the HMD 100. When the radio communication unit 132 receives the image information for display, the reading processing unit 166 displays an image corresponding to the image information for display in the image display largest region PN (step S32).

Figure 8:
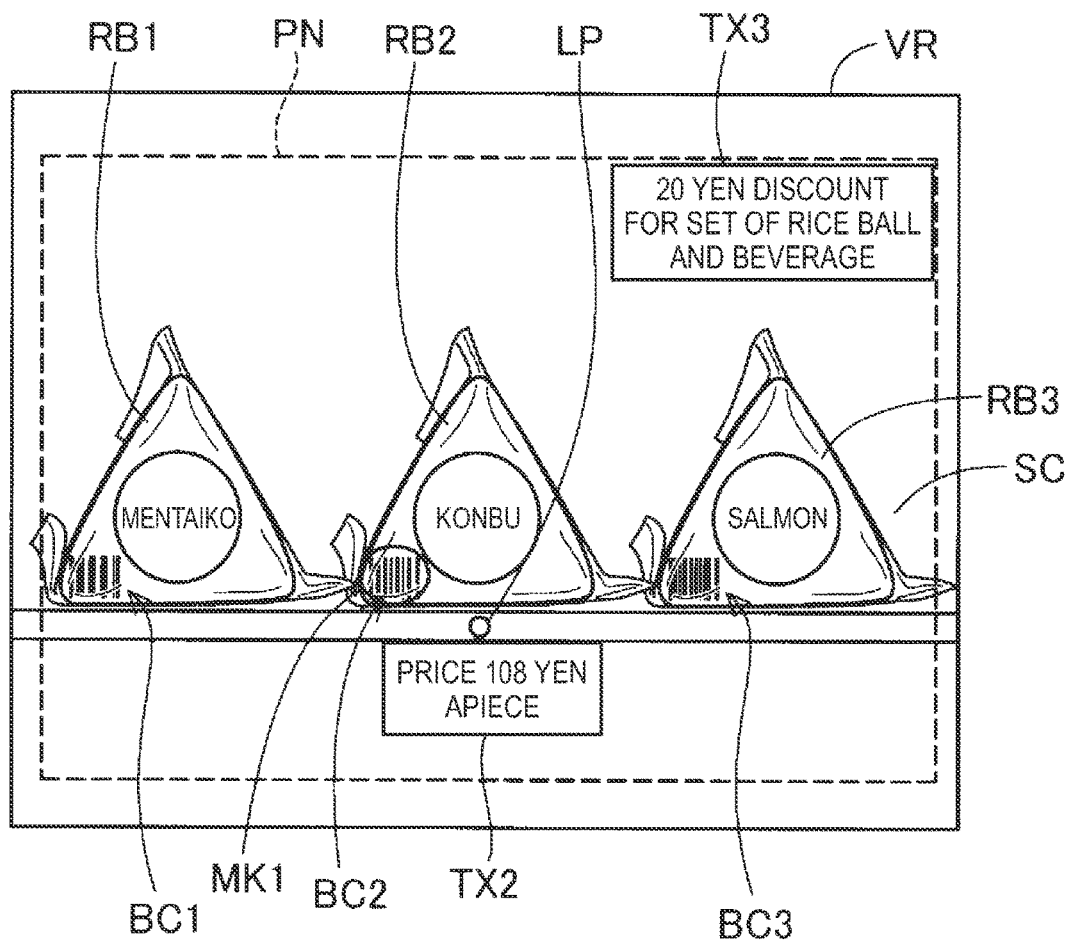
FIG. 8 is an explanatory diagram showing an example of a visual field visually recognized by the user when an image corresponding to image information for display is displayed.

FIG. 8 is an explanatory diagram showing an example of the visual field VR visually recognized by the user US when the image corresponding to the image information for display is displayed. As shown in FIG. 8, the reading processing unit 166 displays, as the image corresponding to the image information for display, a text image TX2 and a text image TX3 in the image display largest region PN instead of the text image TX1 shown in FIG. 7. The text image TX2 is an image set to correspond to the barcode BC2 in advance and is an image representing a price of the rice ball RB2 affixed with the barcode BC2 as "price, 108 yen apiece". The text image TX3 is an image set to correspond to a combination of the light information transmitted from the lamp LP and the barcode BC2 and is an image representing that a discount of 20 yen is applied when a beverage is purchased together with the rice ball RB2.

When a plurality of barcodes functioning as the specific markers are not detected in the processing in step S22 (NO in step S22), the reading processing unit 166 transmits information of the detected detection marker and the light information transmitted from the lamp LP to the radio communication unit 430 of the barcode-information storage server 405 via the radio communication unit 132 (step S28). The reading processing unit 166 performs the processing in step S30 and step S32.

When a barcode functioning as the specific marker is not detected in the processing in step S20 (NO in step S20), the received-wave processing unit 168 receives the light information transmitted from the lamp LP and displays, in the image display largest region PN, an image set to correspond to the received light information (step S34).

Figure 9:
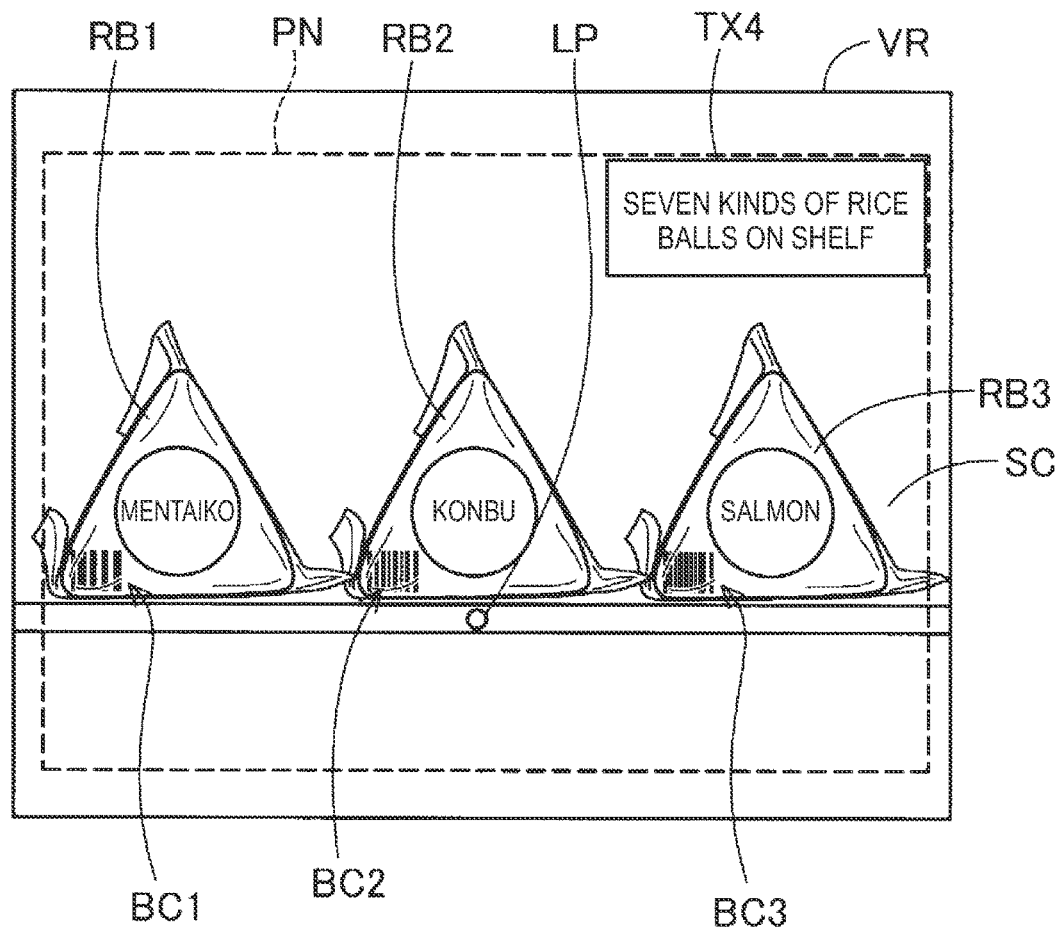
FIG. 9 is an explanatory diagram showing an example of a visual field visually recognized by a user when an image set to correspond to light information is displayed.

FIG. 9 is an explanatory diagram showing an example of the visual field VR visually recognized by the user US when the image set to correspond to the light information is displayed. As shown in FIG. 9, the reading processing unit 166 displays a text image TX4 in the image display largest region PN as the image set to correspond to the light information transmitted from the lamp LP. The text image TX4 is an image set to correspond to only the light information when a barcode functioning as the specific marker is not detected. The text image TX4 is configured by characters "rice ball display shelf" representing commodities displayed on the display shelf on which the lamp LP is disposed and characters "there are seven kinds" representing the number of kinds of rice balls, which are commodities displayed on the display shelf.

When the images corresponding to the various kinds of information are displayed in the image display largest region PN in step S34 or step S32 in FIG. 5, the CPU 140 stands by for the operation unit 135 to receive predetermined operation for ending the information detection processing. When the operation unit 135 does not receive the predetermined operation for ending the information detection processing (NO in step S36), the CPU 140 performs the processing in step S12 and subsequent steps. When the operation unit 135 receives the predetermined operation for ending the information detection processing in the processing in step S36 (YES in step S36), the CPU 140 ends the information detection processing.

As explained above, in the HMD 100 in this embodiment, the reading processing unit 166 and the ten-axis sensor 66 specify the direction of the image display unit 20 and the received-wave processing unit 168 and the light receiving unit 63 receive the light information. When the lamp LP, which transmits the light information, is within the predetermined range in the specified front of the user US, the received-wave processing unit 168 displays, in the image display largest region PN, the image set to correspond to the receive light information. Therefore, in the HMD 100 in this embodiment, when the HMD 100 is in the range in which the light information can be received and the front of the user US faces the lamp LP, according to the reception of the light information, the user US can visually recognize, as an image, information corresponding to a limited region. Consequently, the user US can visually recognize an image corresponding to information corresponding to a place and a direction. Therefore, the user US can acquire necessary information as appropriate.

In the HMD 100 in this embodiment, the reading processing unit 166 detects the barcode functioning as the specific marker out of the picked-up image picked up by the camera 61. The reading processing unit 166 receives the image information for display corresponding to the combination of the received light information and the detected barcode from the barcode-information storage server 405 via the radio communication unit 132 and displays the image corresponding to the image information for display in the image display largest region PN. Therefore, in the HMD 100 in this embodiment, the image displayed in the image display largest region PN is different according to a positional relation between the lamp LP, which transmits the light information, and commodities affixed with barcodes. It is possible to cause the user US to visually recognize a larger number of kinds of images according to places and commodities. Convenience for the user US is improved.

In the HMD 100 in this embodiment, the reading processing unit 166 displays, in the image display largest region PN, the marker selection image MK1 indicating the position of the barcode functioning as the detection marker. Therefore, in the HMD 100 in this embodiment, the user US can visually recognize an image set to correspond to which barcode is displayed. Therefore, convenience of use for the user US is improved.

B. Modifications

Note that the invention is not limited to the embodiment and can be carried out in various forms without departing from the spirit of the invention. For example, modifications explained below are also possible.

B1. Modification 1

In the embodiment, when the plurality of barcodes are detected as the specific markers in the picked-up image, the direction key 16 and the determination key 11 of the operation unit 135 are operated, whereby the detection marker is selected. However, a method of selecting the detection marker can be variously modified. For example, the detection marker may be selected by the direction specifying unit 169 and the ten-axis sensor 66 rather than by the operation in the operation unit 135. When the plurality of barcodes are detected in the picked-up image, the direction specifying unit 169 performs a change of the barcode surrounded by the marker selection image MK1 and selection of the detection marker on the basis of acceleration detected by the ten-axis sensor 66. Specifically, when the ten-axis sensor 66 detects acceleration of a swing to the left of the neck of the user US, the direction specifying unit 169 moves the barcode surrounded by the marker selection image MK1 to another barcode located on the left of the barcode. When the ten-axis sensor 66 detects acceleration corresponding to a nodding action of the user US, the direction specifying unit 169 selects the barcode surrounded by the marker selection image MK1. In this modification, when a plurality of barcodes are detected in a picked-up image, the direction specifying unit 169 and the ten-axis sensor 66 select one barcode as the detection marker on the basis of the direction of the image display unit 20. Therefore, the user US can select the detection marker without operating the operation unit 135 using a hand and can sensuously operate the operation unit 135. Therefore, convenience of use for the user US is improved.

As a method of selecting the detection marker, the movement of the marker selection image MK1 and the selection of the detection marker may be performed on the basis of acceleration detected by an acceleration sensor incorporated in the control unit 10. The movement of the marker selection image MK1 and the selection of the detection marker may be performed by a sound input.

B2. Modification 2

In the embodiment, the light information transmitted from the lamp LP is the electromagnetic wave of the visible light. However, the light information transmitted from the lamp LP may be an electromagnetic wave of light other than the visible light. Instead of the light information, information used for radio communication may be simply used. In the embodiment, the barcode is illustrated as the specific marker. However, the specific marker can be variously modified. For example, as the marker, an identifier such as a QR code (registered trademark), an AR marker, an ID marker, a NyID marker, a Data Matrix marker, a frame marker, a division marker, a marker increased in an information amount by adding colors to these identifiers, a marker created by a multidimensional code, a character readable by an OCR or the like, and the like may be used.

As the specific marker, not only specific identifiers such as barcodes but also various marks and shapes can be adopted. For example, marks and shapes such as a commodity mark of a specific company, a character image of a commodity name, a shape on an outer side of a wrapping of a commodity, a specific name of a place, and a combination of a specific shape and specific characters such as a traffic sign can be adopted. The specific mark in the appended claims includes a mark and the like in a range distinguishable from other shapes.

In the embodiment, the reading processing unit 166 detects the barcode functioning as the specific marker. However, the specific marker does not always have to be detected. The received-wave processing unit 168 may display, on the basis of the light information transmitted from the lamp LP, the image set to correspond to the received light information in the image display largest region PN.

In the embodiment, when the plurality of barcodes are detected as the specific markers, one detection marker is selected. However, the detection marker does not always have to be one detection marker. For example, the reading processing unit 166 may display, in the image display largest region PN, an image corresponding to a combination of the plurality of barcodes and the light information transmitted from the lamp LP. The reading processing unit 166 may detect each of the plurality of barcodes and display, in the image display largest region PN, all images corresponding to the respective barcodes.

In the embodiment, when the plurality of barcodes are detected as the specific markers, the reading processing unit 166 displays the marker selection image MK1 in the image display largest region PN. However, the marker selection image MK1 does not have to be displayed. For example, the reading processing unit 166 may automatically select, as the detection marker, a marker closest to the center set in the predetermined range in the specified front of the user US.

In the embodiment, when the plurality of barcodes are detected as the specific markers, the reading processing unit 166 displays, in the image display largest region PN, the marker selection image MK1 surrounding one barcode closest from the center of the picked-up image (FIG. 7). However, a method of detecting one barcode out of the plurality of barcodes can be variously modified. For example, the reading processing unit 166 may select one barcode according to degrees of importance of commodities respectively associated with barcodes and affixed with the barcodes. Examples of the degrees of importance of commodities include commodities particularly recommended for sales by a store that sells commodities, a degree of a discount, and a best-selling commodity. When the specific marker is a signboard set in a passage or a transmission source of an iBeacon (a registered trademark) rather than a displayed commodity, information concerning accident information may be preferentially displayed in the image display largest region PN. It is also possible that a frequency included in a picked-up image is counted, a commodity affixed with a barcode with a high frequency is determined as a target of interest of the user US of the HMD 100, and an image associated with the determined barcode is preferentially displayed in the image display largest region PN.

B3. Modification 3

Figure 10:
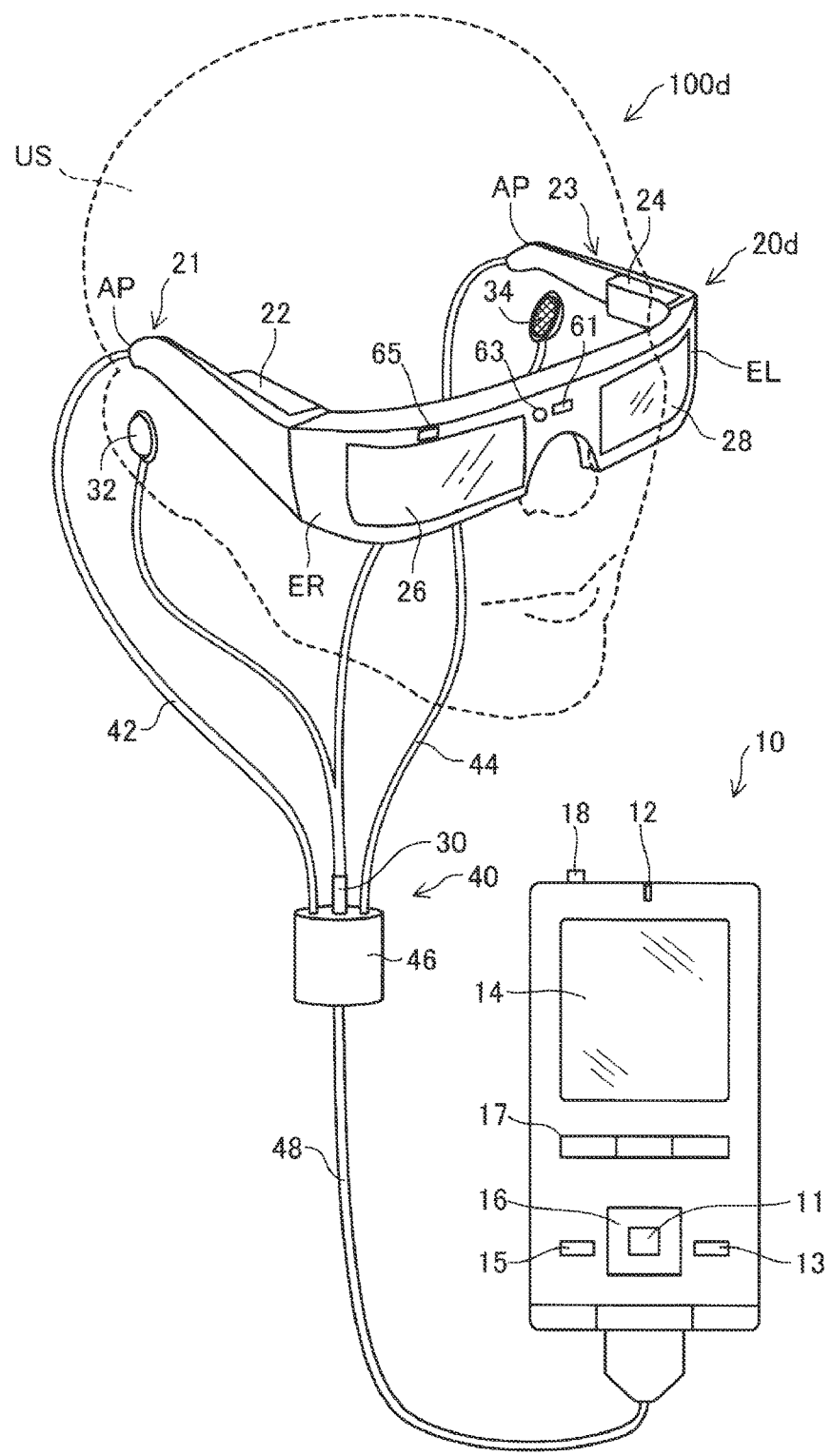
FIG. 10 is an explanatory diagram showing the external configuration of an HMD in a modification.

The HMD 100 may include a camera different from the camera 61. FIG. 10 is an explanatory diagram showing the external configuration of an HMD 100d in a modification. The HMD 100d in the modification is different from the HMD 100 in the embodiment only in that a second camera 65 different from the camera 61 is formed in an image display unit 20d. The other components are the same as the components of the HMD 100. In the image display unit 20d in this modification, images of an outside scene SC are picked up by two cameras, i.e., the camera 61 and the second camera 65, whereby the positions of a commodity affixed with a barcode included in the picked-up images of the two cameras and the image display unit 20d are measured by using the trigonometry. Specifically, concerning a target included in both of the picked-up image of the camera 61 and the picked-up image of the second camera 65, the direction specifying unit 169 measures the distance between the image display unit 20d and the target by using the trigonometry. In this case, in step S32 in FIG. 5, the reading processing unit 166 may display, in the image display largest region PN, images corresponding to the information of the detection marker, the light information transmitted from the lamp LP, the measured distance between the detection marker and the image display unit 20. Examples of the image corresponding to the distance include an image in which a font of a character image is set larger as the distance is shorter and an image including more information associated with the detection marker as the distance is shorter. In the HMD 100d in this modification, it is possible to cause the user US to visually recognize an image formed taking into account the distance between the detection marker and the image display unit 20d as well. Convenience for the user US is improved. Note that the camera 61, the second camera 65, and the direction specifying unit 169 in the HMD 100d are equivalent to a distance measuring unit in the appended claims.

A method of measuring the distance between the image display unit 20d and the detection marker can be variously modified as methods such as a method of measuring the distance to the detection marker using an infrared-light emitting unit and a receiving unit formed in the image display unit 20d besides the method of using the plurality of cameras explained above. When a microphone for acquiring sound on the outside is formed in the image display unit 20d, the reading processing unit 166 may display an image in the image display largest region PN taking into account sound acquired by the microphone as well.

In the explanation in the embodiment, the position of the user US and the position of the lamp LP are fixed. However, the invention can also be applied when the user US and the lamp LP are moving. For example, the invention can be applied to inventory management of a physical distribution system, guidance in a warehouse used in the physical distribution system, a commercial complex, and the like. In this case, the invention is effective in acquiring, through short-range communication (e.g., iBeacon or an LED bulb), information that cannot be acquired only with place information specified by a GPS module or the like. An image corresponding to a combination of a plurality of kinds of information transmitted from the information transmission source explained above may be displayed in the image display largest region PN.

B4. Modification 4

In the embodiment, the shelf 340 on which the rice balls RB1, RB2, and RB3 are displayed is explained as an example. However, the light information transmitted from the lamp LP and the barcode functioning as the specific marker can be variously modified. For example, instead of the shelf 340 on which the rice balls are displayed, a shelf on which beverage commodities are displayed may be used. In the shelf, a text image same as the text image TX3 (FIG. 8) may be displayed in the image display largest region PN as in the embodiment. In a physical distribution system in a warehouse or the like in which beverage commodities or the like are stored, the lamps LP respectively disposed in a plurality of shelves may transmit light information indicating types and positions of commodities stored on the shelves.

The lamp LP may be disposed in a vending machine for selling beverage commodities or the like. For example, the lamp LP disposed in the vending machine may provide a supplementary service when a beverage commodity is purchased. As the supplementary service, when "hit" comes out when a beverage commodity is purchased, the lamp LP may display, in the image display largest region PN, a text image indicating that a beverage commodity is further provided free of charge or display. The lamp LP may display weather information such as temperature and humidity of the day in the image display largest region PN.

The lamp LP may be disposed in a signboard showing sale of commodities in a store. In a signboard set to be conspicuously seen from the distance, as an example of commodities for sale shown in a limited advertisement space, for example, in some case, only "sake" can be shown. However, names of kinds of sake sold by the store may be displayed by the lamp LP set in the signboard as a text image or the like in the image display largest region PN. These signboards may include a signboard that displays different characters and the like according to time like an electric signboard.

The lamp LP may be disposed in a public facility such as a traffic light. In the lamp LP disposed in the traffic light, for example, by receiving light information transmitted by the lamp LP, as in a VICS (Vehicle Information and Communication System: registered trademark), traffic jam information, road surface information, and the like are displayed in the image display largest region PN. The user US can recognize the information even if a car navigation system is not provided.

B5. Modification 5

In the embodiment, the operation unit 135 is formed in the control unit 10. However, the form of the operation unit 135 can be variously modified. For example, a user interface, which is the operation unit 135, separate from the control unit 10 may be provided. In this case, since the operation unit 135 is separate from the control unit 10 on which the power supply 130 and the like are formed, the operation unit 135 can be reduced in size. The operability of the user US is improved. In the embodiment, the camera 61 is formed in the image display unit 20. The camera 61 may be formed separately from the image display unit 20 and capable of picking up an image of an outside scene.

For example, the image-light generating unit may include a display of organic EL (Organic Electro-Luminescence) and an organic EL control unit. For example, the image-light generating unit can use, instead of the LCD, an LCoS (Liquid crystal on silicon, LCoS is a registered trademark), a digital micro-mirror device, and the like. For example, the invention can also be applied to the HMD 100 of a laser retina projection type.

For example, the HMD 100 may be a head mounted display in which the optical-image display unit covers only a part of the eyes of the user US, in other words, the optical-image display unit does not completely cover the eyes of the user US. The HMD 100 may be a head mounted display of a so-called monocular type. In the embodiment, the HMD 100 is a binocular optical transmission type. However, the invention can also be applied to head-mounted display devices of other types such as a video transmission type.

As the earphone, an ear hook type or a headband type may be adopted. The earphone may be omitted. For example, the head-mounted display device may be configured as a head-mounted display device mounted on vehicles such as an automobile and an airplane. For example, the head-mounted display device may be configured as a head-mounted display device incorporated in body protective equipment such as a helmet.

B6. Modification 6

The configuration of the HMD 100 in the embodiment is only an example and can be variously modified. For example, the direction key 16 provided in the control unit 10 may be omitted. Another interface for operation such as a stick for operation may be provided in addition to the direction key 16 and the track pad 14. Input devices such as a keyboard and a mouse may be connectable to the control unit 10. The control unit 10 may receive inputs from the keyboard and the mouse.

As the image display unit, instead of the image display unit 20 worn like eyeglasses, an image display unit of another system such as an image display unit worn like a cap may be adopted. The earphones 32 and 34 can be omitted as appropriate. In the embodiment, the LCD and the light source are used as the components that generate image light. However, instead of the LCD and the light source, another display element such as an organic EL display may be adopted.

Figure 11A:
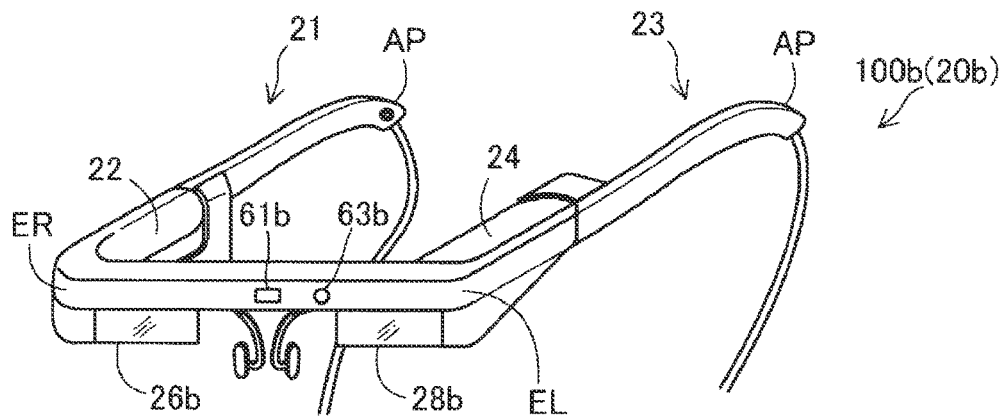
FIGS. 11A and 11B are explanatory diagrams showing the external configurations of HMDs in a modification.
Figure 11B:
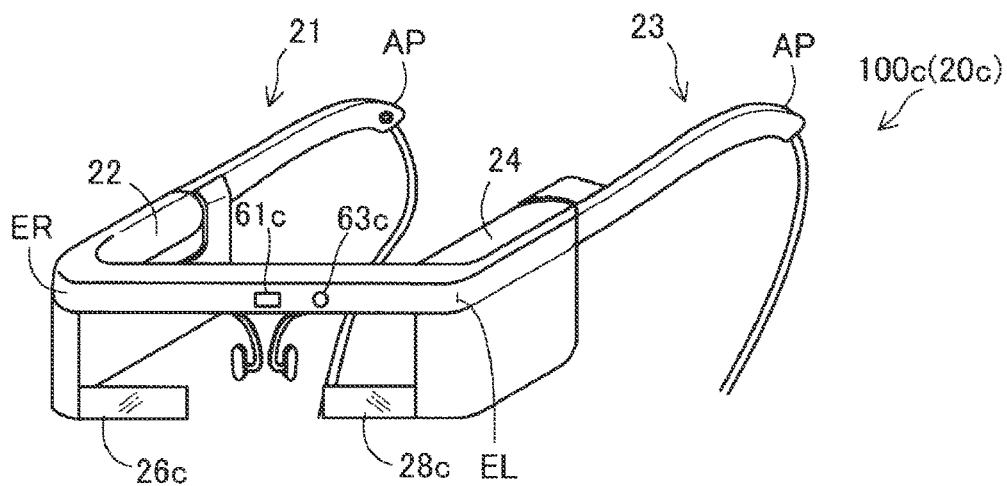

FIGS. 11A and 11B are explanatory diagrams showing the external configurations of HMDs in a modification. In the case of an example shown in FIG. 11A, the HMD is different from the HMD 100 shown in FIG. 1 in that an image display unit 20a includes a right optical-image display unit 26a instead of the right optical-image display unit 26 and includes a left optical-image display unit 28a instead of the left optical-image display unit 28. The right optical-image display unit 26a is formed smaller than the optical member in the embodiment and disposed obliquely above the right eye of the user US during wearing of an HMD 100a. Similarly, the left optical-image display unit 28b is formed smaller than the optical member in the embodiment and disposed obliquely above the left eye of the user US during wearing of the HMD 100a. In the case of an example shown in FIG. 11B, the HMD is different from the HMD 100 shown in FIG. 1 in that an image display unit 20b includes a right optical-image display unit 26b instead of the right optical-image display unit 26 and includes a left optical-image display unit 28b instead of the left optical-image display unit 28. The right optical-image display unit 26b is formed smaller than the optical member in the embodiment and disposed obliquely below the right eye of the user US during wearing of an HMD 100b. The left optical-image display unit 28b is formed smaller than the optical member in the embodiment and disposed obliquely below the left eye of the user US during wearing of the HMD 100b. In this way, the optical-image display unit only has to be disposed in the vicinity of the eyes of the user US. The size of the optical member forming the optical-image display unit may be any size. The HMD 100 can be implemented in which the optical-image display unit covers only a part of the eyes of the user US, in other words, the optical-image display unit does not completely cover the eyes of the user US.

In the embodiment, the HMD 100 may guide image light representing the same image to the left and right eyes of the user US and cause the user US to visually recognize a two-dimensional image or may guide image light representing different images to the left and right eyes of the user US and cause the user US to visually recognize a three-dimensional image.

In the embodiment, a part of the components implemented by hardware may be replaced with software. Conversely, a part of the components implemented by software may be replaced with hardware. For example, in the embodiment, the image processing unit 160 and the sound processing unit 170 are implemented by the CPU 140 reading out and executing a computer program. However, these functional units may be implemented by a hardware circuit.

When a part or all of the functions of the invention are implemented by software, the software (computer program) can be provided while being stored in a computer-readable recording medium. In the invention, the "computer-readable recording medium" is not limited to portable recording media such as a flexible disk and a CD-ROM and includes various internal storage devices in a computer such as a RAM and a ROM and external storage devices fixed to the computer such as a hard disk.

In the embodiment, as shown in FIGS. 2 and 3, the control unit 10 and the image display unit 20 are formed as the separate components. However, the configuration of the control unit 10 and the image display unit 20 is not limited to this and can be variously modified. For example, on the inside of the image display unit 20, all of the components formed in the control unit 10 may be formed or a part of the components may be formed. The power supply 130 in the embodiment may be independently formed and configured to be replaceable. The components formed in the control unit 10 may be redundantly formed in the image display unit 20. For example, the CPU 140 shown in FIG. 2 may be formed in both of the control unit 10 and the image display unit 20. The functions of the CPU 140 formed in the control unit 10 and the CPU formed in the image display unit 20 may be divided.

The invention is not limited to the embodiments and the modifications explained above and can be implemented as various configurations without departing from the spirit of the invention. For example, the embodiments corresponding to the technical features in the aspects described in the summary of the invention and the technical features in the modifications can be replaced or combined as appropriate in order to solve a part or all of the problems or attain a part or all of the effects. Unless the technical features are explained in this specification as essential technical features, the technical features can be deleted as appropriate.

The entire disclosure of Japanese Patent Application No. 2014-114540, filed Jun. 3, 2014 is expressly incorporated by reference herein.

What is claimed is:

1. A head-mounted display device of a transmission type comprising:
    a light receiving unit;
    a display capable of displaying an image and transmitting an outside scene;
    a camera; and
    a processor or circuit configured to:
        specify a direction of a visual line of a user of the head-mounted display device;
        receive, by the light receiving unit, light information transmitted from a light source on another device that is different from the head-mounted display device;
        determine, based on the received light information, whether the light source is present within a predetermined range; and
        when the light source is present within the predetermined range:
            responsive to receiving the light information that is within the predetermined range and that is transmitted from the light source on the another device that is different from the head-mounted display device: cause the camera to capture an image in a range of a visual field assumed to be visually recognized by a user of the head-mounted display device and detect, out of the captured image, a specific marker, and responsive to detecting the specific marker: transmit, to a sever, information regarding the detected specific marker and the light information, receive, from the server, information concerning an item affixed with the detected specific marker, and control the display to display the information concerning the item affixed with the detected specific marker.

2. The head-mounted display device according to claim 1, wherein the information concerning the item affixed with the detected specific marker is an image associated with the item affixed with the detected specific marker.

3. The head-mounted display device according to claim 2, wherein the processor or circuit is further configured to: extract, when a plurality of specific markers are detected out of the captured image, one specific marker out of the plurality of detected specific markers as the specific marker.

4. The head-mounted display device according to claim 2, wherein the processor or circuit is further configured to:
    measure a distance between the display and the specific marker, and
    cause the display to display an image associated with the measured distance as the information concerning the item affixed with the detected specific marker.

5. The head-mounted display device according to claim 4, wherein the processor or circuit is further configured to: control the display to display, when a plurality of specific markers are detected out of the captured image, an image associated with the specific marker, from among the plurality of specific markers, that has a smallest distance to the display.

6. The head-mounted display device according to claim 1, wherein the another device is a light-emitting device, and the received light information is emitted by the light-emitting device.

7. The head-mounted display device according to claim 6, wherein the another device is a light on a shelf.

8. The head-mounted display device according to claim 1, wherein the processor or circuit is further configured to:

detect, out of the captured image, a matrix-type or two-dimensional barcode functioning as the specific marker.

9. The head-mounted display device according to claim 8, wherein the processor or circuit is further configured to:
when the matrix-type or two-dimensional barcode is detected as the specific marker, which is set in advance, determine whether a plurality of matrix-type or two-dimensional barcodes are detected as specific markers, and control the display to display a marker selection image for selecting one matrix-type or two-dimensional barcode out of the detected plurality of matrix-type or two-dimensional barcodes.

10. The head-mounted display device according to claim 9, further comprising a radio communication unit, wherein the processor or circuit is further configured to:
upon receipt of an operation for selecting one specific matrix-type or two-dimensional barcode out of the plurality of matrix-type or two-dimensional barcodes, set the one matrix-type or two-dimensional barcode as the detected specific marker;
transmit, via the radio communication unit to the server, the one matrix-type or two-dimensional barcode as the detected specific marker with the light information;
receive, via the radio communication unit from the server, information concerning a commodity affixed with the one matrix-type or two-dimensional barcode as the information concerning the item affixed with the detected specific marker; and
control the display to display the information concerning the commodity with the one matrix-type or two-dimensional barcode as the information concerning the item affixed with the detected specific marker.

11. The head-mounted display device according to claim 8, wherein the matrix-type or two-dimensional barcode is one of: a quick response (QR) code, an augmented reality (AR) marker, an ID marker, a NyID marker, a Data Matrix marker, a frame marker, a division marker, a marker increased in an information amount by adding colors to the marker, a marker created by a multidimensional code, and a character readable by optical character recognition (OCR).

12. The head-mounted display device according to claim 1, wherein the light information indicates information regarding commodities stored on one or more shelves that the light source is positioned on.

13. The head-mounted display device according to claim 12, wherein the information regarding the commodities is information indicating types and/or positions of the commodities stored on the one or more shelves.

14. The head-mounted display device according to claim 1, wherein the light information is information transmitted as an electromagnetic wave of visible light.

15. A method of controlling a head-mounted display device of a transmission type that includes a light receiving unit, and a display capable of displaying an image and transmitting an outside scene, the method comprising:
specifying a direction of a visual line of a user of the head-mounted display device;
receiving, by the light receiving unit of the head-mounted display device, light information transmitted from a light source on another device that is different from the head-mounted display device;
determining, based on the received light information, whether the light source is present within a predetermined range;
when the light source is present within the predetermined range:
responsive to receiving the light information that is within the predetermined range and that is transmitted from the light source on the another device that is different from the head-mounted display device: causing the camera to capture an image in a range of a visual field assumed to be visually recognized by a user of the head-mounted display device, detecting, out of the captured image, a specific maker, and responsive to detecting the specific marker: transmitting, to a server, information regarding the detected specific marker and the light information, receiving, from the server, information concerning an item affixed with the detected specific marker, and controlling the display to display the information concerning the item affixed with the detected specific marker.

16. An information transmitting and receiving system comprising:
an information transmitting device configured to cause light information to be transmitted; and
a head-mounted display device of a transmission type that is different from the information transmitting device, wherein
the head-mounted display device includes:
a light receiving unit;
a display capable of displaying an image and transmitting an outside scene; and
a processor or circuit configured to:
specify a direction of a visual line of a user of the head-mounted display device;
receive, by the light receiving unit, the light information transmitted from a light source on the information transmitting device that is different from the head-mounted display device;
determine, based on the received light information, whether the light source is present within a predetermined range; and
when the light source is present within the predetermined range: responsive to receiving the light information that is within the predetermined range and that is transmitted from the light source on the another device that is different from the head-mounted display device: cause the camera to capture an image in a range of a visual field assumed to be visually recognized by a user of the head-mounted display device, detect, out of the captured image, a specific marker, and responsive to detecting the specific marker: transmit, to a server, information regarding the detected specific marker and the light information, receive, from the server, information concerning an item affixed with the detected specific marker, and control the display to display the information concerning the item affixed with the detected specific marker.

17. The head-mounted display device according to claim 16, wherein the information transmitting device further comprises a memory configured to store the light information to be transmitted.

18. A non-transitory computer readable medium for a head-mounted display device of a transmission type that includes a light receiving unit, a display capable of displaying an image and transmitting an outside scene, and a processor, the non-transitory computer readable medium comprising computer-executable instructions that, when executed by the processor of the head-mounted display device, cause the processor to:

specify a direction of a visual line of a user of the head-mounted display device;

receive, by the light receiving unit, light information transmitted from a light source of another device that is different from the head-mounted display device;

determine, based on the received light information, whether the light source is present within a predetermined range; and when the light source is present within the predetermined range:

responsive to receiving the light information that is within the predetermined range and that is transmitted from the light source on the another device that is different from the head-mounted display device: cause the camera to capture an image in a range of a visual field assumed to be visually recognized by a user of the head-mounted display device and detect, out of the captured image, a specific marker, and responsive to detecting the specific marker: transmit, to a sever, information regarding the detected specific marker and the light information, receive, from the server, information concerning an item affixed with the detected specific marker, and control the display to display the information concerning the item affixed with the detected specific marker.

\* \* \* \* \*